US008265632B2

(12) United States Patent
Kitahara

(10) Patent No.: US 8,265,632 B2
(45) Date of Patent: Sep. 11, 2012

(54) RADIO COMMUNICATION SYSTEM, MOVEMENT MANAGEMENT METHOD, MANAGEMENT APPARATUS, AND BASE STATION APPARATUS

(75) Inventor: Yoshinori Kitahara, Tokyo (JP)

(73) Assignee: NEC Corporation, Tokyo (JP)

( * ) Notice: Subject to any disclaimer, the term of this patent is extended or adjusted under 35 U.S.C. 154(b) by 463 days.

(21) Appl. No.: 12/536,088

(22) Filed: Aug. 5, 2009

(65) Prior Publication Data

US 2010/0041400 A1 Feb. 18, 2010

(30) Foreign Application Priority Data

Aug. 15, 2008 (JP) .................................. 2008-209190

(51) Int. Cl.
*H04W 36/00* (2009.01)

(52) U.S. Cl. ........ 455/443; 455/436; 455/442; 455/446; 455/449; 455/560; 370/331

(58) Field of Classification Search .................. 455/434, 455/436–449, 560, 561; 370/331, 338
See application file for complete search history.

(56) References Cited

U.S. PATENT DOCUMENTS

| | | | | |
|---|---|---|---|---|
| 5,317,623 A | * | 5/1994 | Sakamoto et al. | 455/436 |
| 6,131,033 A | * | 10/2000 | Shi | 455/446 |
| 7,162,244 B1 | * | 1/2007 | Toskala | 455/436 |
| 7,353,029 B2 | * | 4/2008 | Choi et al. | 455/437 |
| 7,548,751 B2 | * | 6/2009 | Katori et al. | 455/443 |
| 7,630,716 B2 | * | 12/2009 | Tamura et al. | 455/439 |
| 7,769,378 B2 | * | 8/2010 | Dorenbosch et al. | 455/435.1 |
| 7,957,352 B2 | * | 6/2011 | Vanghi et al. | 370/335 |
| 8,010,110 B2 | * | 8/2011 | Hasegawa | 455/436 |
| 8,041,358 B2 | * | 10/2011 | Unno et al. | 455/440 |
| 2005/0096052 A1 | * | 5/2005 | Csapo et al. | 455/439 |
| 2005/0148368 A1 | * | 7/2005 | Scheinert et al. | 455/561 |
| 2007/0058639 A1 | * | 3/2007 | Khan | 370/395.52 |
| 2007/0060126 A1 | * | 3/2007 | Taniguchi et al. | 455/436 |
| 2007/0061155 A1 | * | 3/2007 | Ji et al. | 705/1 |
| 2007/0218888 A1 | * | 9/2007 | De Froment | 455/422.1 |
| 2008/0192691 A1 | * | 8/2008 | Park et al. | 370/331 |
| 2009/0069020 A1 | * | 3/2009 | Wang et al. | 455/446 |

FOREIGN PATENT DOCUMENTS

| | | |
|---|---|---|
| JP | 02214342 A2 | 8/1990 |
| JP | H02214342 | 8/1990 |
| JP | 06261365 A2 | 9/1994 |
| JP | H06261365 | 9/1994 |
| JP | 2001351134 | 12/2001 |
| JP | 2001351134 A2 | 12/2001 |
| JP | 2003030701 A | 1/2003 |
| JP | 2007-43376 A | 2/2007 |
| JP | 2007043376 | 2/2007 |

OTHER PUBLICATIONS

Japanese Office Action for JP2008-209190 mailed on Mar. 21, 2012.
Office action in counterpart Japanese patent application 94110040, dated Mar. 21, 2012.

* cited by examiner

*Primary Examiner* — Sharad Rampuria

(57) ABSTRACT

A radio communication system includes a plurality of base station apparatuses. In the radio communication system, the communication areas of the plurality of base station apparatuses are connected in a loop to form a borderline separating the inside and the outside of a management area. The radio communication system detects a mobile terminal which enters the management area by crossing the borderline on the basis of communication between the base station apparatuses and a mobile terminal.

13 Claims, 10 Drawing Sheets

RADIO COMMUNICATION SYSTEM, MOVEMENT MANAGEMENT METHOD, MANAGEMENT APPARATUS, AND BASE STATION APPARATUS

This application is based upon and claims the benefit of priority from Japanese Patent Application No. 2008-209190 filed on Aug. 15, 2008, the content of which is incorporated by reference.

BACKGROUND OF THE INVENTION

1. Field of the Invention

The present invention relates to a radio communication system which manages entry of a mobile terminal into a predetermined area.

2. Description of the Related Art

There is available a technique for detecting a mobile terminal's entering a predetermined area or a mobile terminal's exiting the predetermined area using radio communication. This technique is expected to be applied to various fields. For example, road pricing assumes that when a vehicle enters a toll area, the vehicle is charged a predetermined fare. However, implementation of the road pricing requires installation of an apparatus for detecting entry of a vehicle on every road through which a vehicle can enter a toll area and suffers from time or cost problems.

As a countermeasure against this, Japanese Patent Laid-Open No. 2003-30701 discloses a technique for determining the position of a vehicle on which a mobile terminal is mounted using a base station apparatus of a mobile communication system and sensing, from the position, whether the vehicle has entered a toll area. The technique eliminates the need to install an entry detection apparatus on every road.

However, in order to detect every vehicle entering a toll area by the technique disclosed in Japanese Patent Laid-Open No. 2003-30701, regardless of channel through which the vehicle enters the toll area, it is necessary to enable all base station apparatuses within the toll area to detect entry of a mobile terminal instead of installing an entry detection apparatus on every road. For this reason, all the base station apparatuses within the toll area need to support road pricing.

SUMMARY OF THE INVENTION

An object of the present invention is to provide a technique for efficiently building a radio communication system which detects entry of a mobile terminal into a predetermined area.

In order to achieve the above-described object, a radio communication system according to an exemplary aspect of the invention comprises a plurality of base station apparatuses, communication areas of the plurality of base station apparatuses connected in a loop to form a borderline separating an inside and an outside of a management area, and a mobile terminal which enters the management area by crossing the borderline and which is detected on the basis of communication between the base station apparatuses and the mobile terminal.

A movement management method according to an exemplary aspect of the invention comprises connecting communication areas of a plurality of base station apparatuses in a loop to form a borderline separating an inside and an outside of a management area and detecting a mobile terminal which enters the management area by crossing the borderline on the basis of communication between the base station apparatuses and the mobile terminal.

The above and other objects, features, and advantages of the present invention will become apparent from the following description with references to the accompanying drawings which illustrate examples of the present invention.

DETAILED DESCRIPTION OF THE PREFERRED EMBODIMENTS

Exemplary embodiments will be described in detail below with reference to the drawings.

First Exemplary Embodiment

Figure 1:
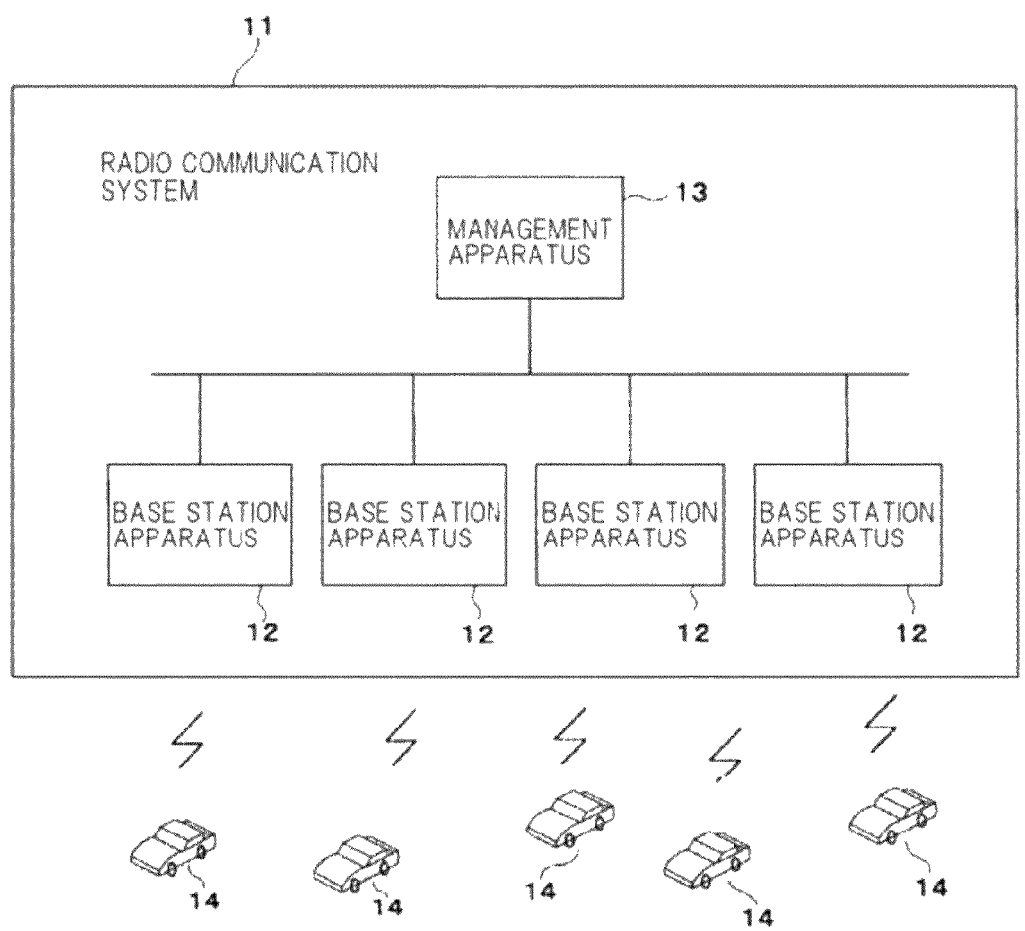
FIG. 1 is a block diagram showing the configuration of a radio communication system according to a first exemplary embodiment.

FIG. 1 is a block diagram showing the configuration of a radio communication system according to a first exemplary embodiment. This exemplary embodiment implements provision of a spatial gateway for watching for entry of a mobile terminal into a predetermined management area. A spatial gateway is formed by a base station apparatus of a radio communication system.

Referring to FIG. 1, radio communication system 11 according to this exemplary embodiment includes a plurality of base station apparatuses 12 and management apparatus 13 and connects wirelessly to mobile terminal 14 through base station apparatus 12. As an example, mobile terminal 14 is mounted on a car here. Each base station apparatus 12 has a communication area and can communicate with mobile terminal 14 within the communication area.

Figure 2:
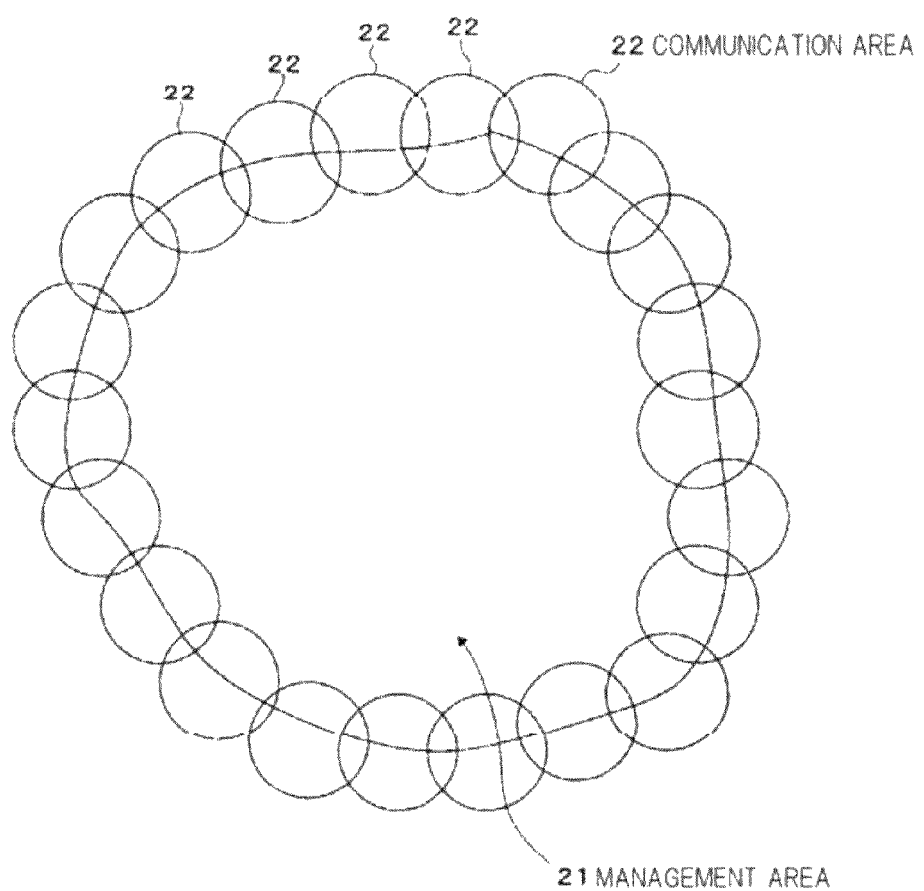
FIG. 2 is a view showing the placement of communication areas of a plurality of base station apparatuses 12.

FIG. 2 is a view showing the placement of communication areas of the plurality of base station apparatuses 12. Referring to FIG. 2, communication areas 22 of the plurality of base station apparatuses 12 are connected in a loop to form a borderline separating the inside and the outside of management area 21.

In radio communication system 11, each base station apparatus 12 communicates with mobile terminal 14 within its communication area 22. This allows radio communication system 11 to detect mobile terminal 14 which enters management area 21 by crossing the borderline. Management apparatus 13 includes a database (not shown) for managing mobile terminals 14 within management area 21 and records identification information, that indicates that mobile terminal 14 has entered management area 21, in the database.

According to this exemplary embodiment, since base station apparatuses 12 are placed along the borderline, it is possible to efficiently build a radio communication system which detects entry of mobile terminal 14 into management area 21.

For example, base station apparatus 12 alone may detect entry of mobile terminal 14 into management area 21 and notify management apparatus 13 of the identification information of mobile terminal 14 having entered management area 21. In this case, management apparatus 13 only needs to register the identification information notified by base station apparatus 12 in the database.

Figure 3:
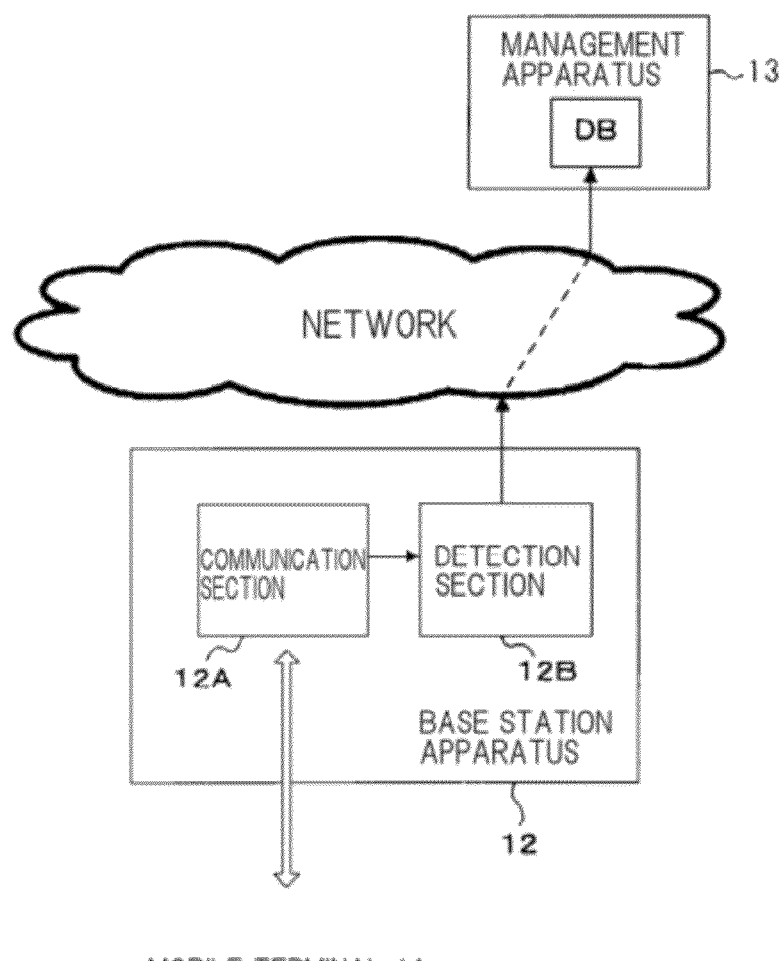
FIG. 3 is a block diagram showing an example of the configuration of base station apparatus 12.

FIG. 3 is a block diagram showing an example of the configuration of base station apparatus 12. FIG. 3 shows the configuration of base station apparatus 12 when base station apparatus 12 alone detects entry of mobile terminal 14 into management area 21. Referring to FIG. 3, base station apparatus 12 in this example includes communication section 12A and detection section 12B. Communication section 12A communicates with mobile terminal 14 and notifies detection section 12B of the status of the communication. Detection section 12B detects entry of mobile terminal 14 into management area 21 on the basis of the notified communication status and notifies management apparatus 13 of the identification information of mobile terminal 14 whose entry is detected.

As another example, management apparatus 13 may monitor the status of communication between base station apparatus 12 and mobile terminal 14 and determine the presence or absence of the entry of mobile terminal 14 into management area 21 based on the monitoring result. As still another example, management apparatus 13 may communicate with mobile terminal 14 via base station apparatus 12 and determine the presence or absence of the entry of mobile terminal 14 into management area 21 based on a communication result.

Figure 4:
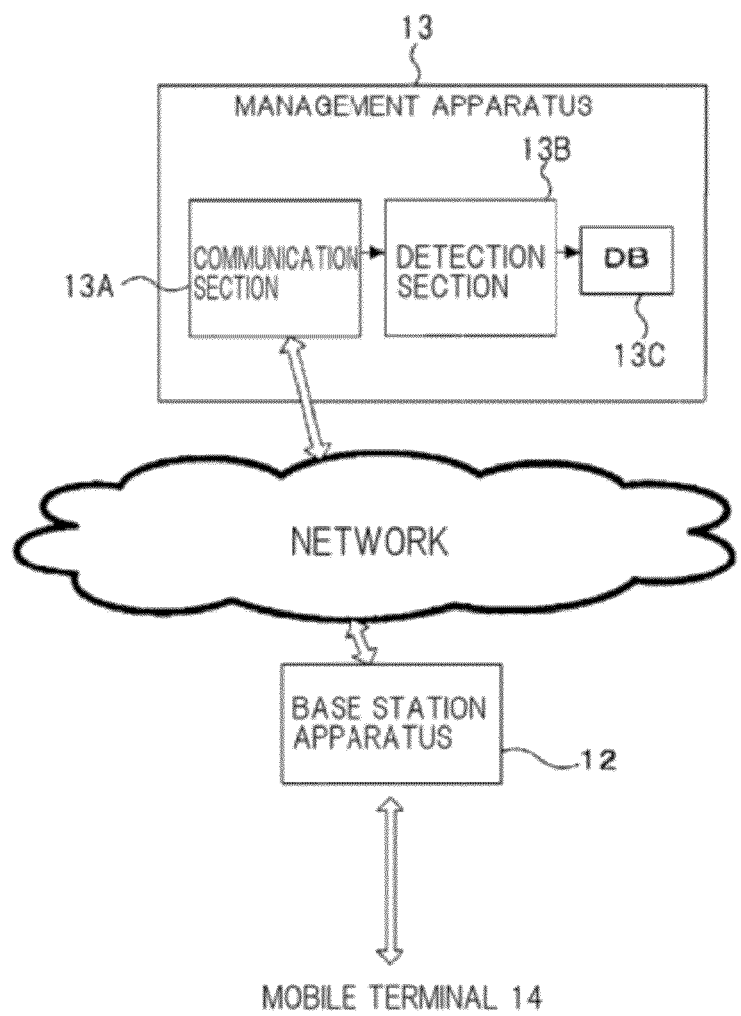
FIG. 4 is a block diagram showing an example of the configuration of management apparatus 13.

FIG. 4 is a block diagram showing an example of the configuration of management apparatus 13. FIG. 4 shows the configuration of management apparatus 13 when management apparatus 13 detects the entry of mobile terminal 14 into management area 21. Referring to FIG. 4, management apparatus 13 in this example includes communication section 13A, detection section 13B, and database 13C. Communication section 13A communicates with mobile terminal 14 via base station apparatus 12 and notifies detection section 13B of the status of the communication between base station apparatus 12 and mobile terminal 14. Detection section 13B detects entry of mobile terminal 14 into management area 21 on the basis of the notified communication status and registers the identification information of mobile terminal 14 whose entry is detected in database 13C.

Note that although FIG. 2 shows communication area 22 having a shape based on the assumption that base station apparatus 12 includes a non-directional antenna, the present invention is not limited to this. As another example, base station apparatus 12 may include a directional antenna.

Figure 5:
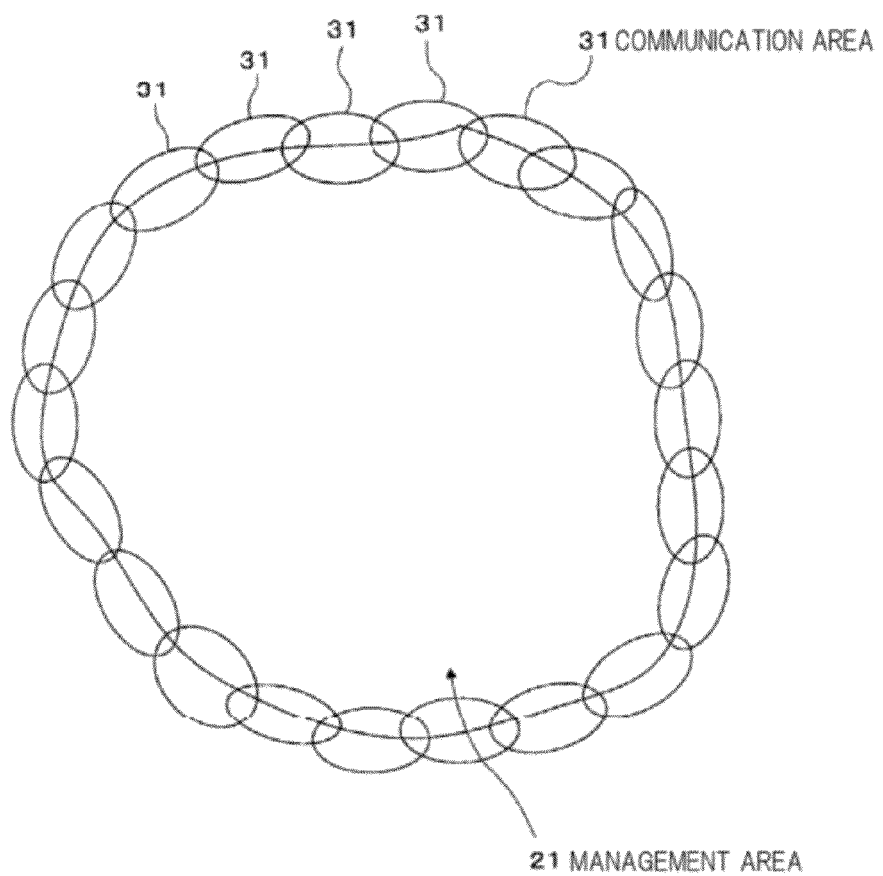
FIG. 5 is a view showing the placement of communication areas of the plurality of base station apparatuses 12 including directional antennas.

FIG. 5 is a view showing the placement of communication areas of the plurality of base station apparatuses 12 including directional antennas. Referring to FIG. 5, communication areas 31 established by directional antennas are connected in a loop to form a borderline separating the inside and the outside of management area 21. The pointing direction of each directional antenna and the longitudinal direction of the borderline coincide with each other. This configuration allows formation of a borderline using a small number of base station apparatuses 12 or requires lower transmission power.

Although FIG. 2 shows an example in which the inside and the outside of management area 21 are separated by one borderline, the present invention is not limited to this. As another example, two borderlines may be established.

Figure 6:
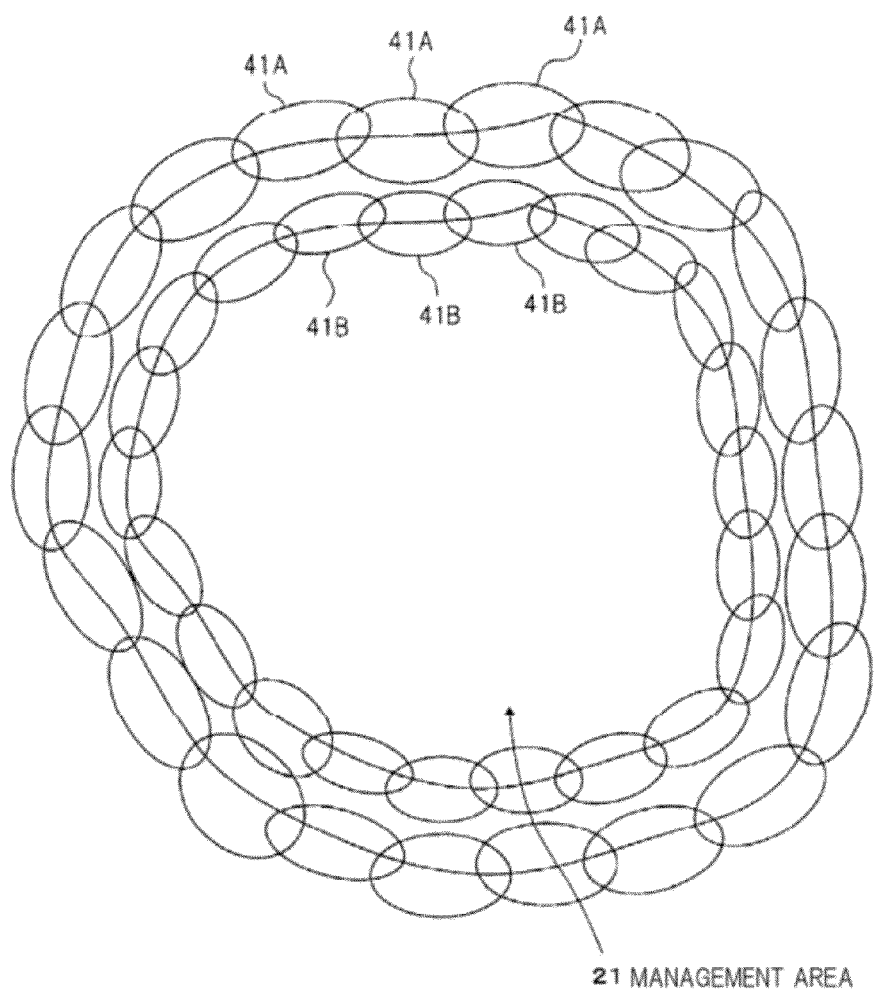
FIG. 6 is a view showing the placement of communication areas when two borderlines are established.

FIG. 6 is a view showing the placement of communication areas when two borderlines are established. Referring to FIG. 6, the inside and the outside of management area 21 are separated by two borderlines. The outer borderline is formed of communication areas 41A while the inner borderline is formed of communication areas 41B. With this configuration, it is possible to easily and reliably determine, based on the order of the borderlines in which mobile terminal 14 communicates with base station apparatus 12, the order of the borderlines in which mobile terminal 14 communicates with base station apparatus 12s, whether mobile terminal 14 has entered management area 21 or has exited management area 21. It is also possible to prevent mobile terminal 14 that remains near the border from frequently entering and exiting management area 21 due to a change in radio wave condition or the like.

When mobile terminal 14 communicates with base station apparatus 12 in communication area 41A and then communicates with base station apparatus 12 in communication area 41B, mobile terminal 14 may be determined to have entered management area 21. On the other hand, when mobile terminal 14 communicates with base station apparatus 12 in communication area 41B and then communicates with base station apparatus 12 in communication area 41A, mobile terminal 14 may be determined to have exited management area 21.

Figure 7:
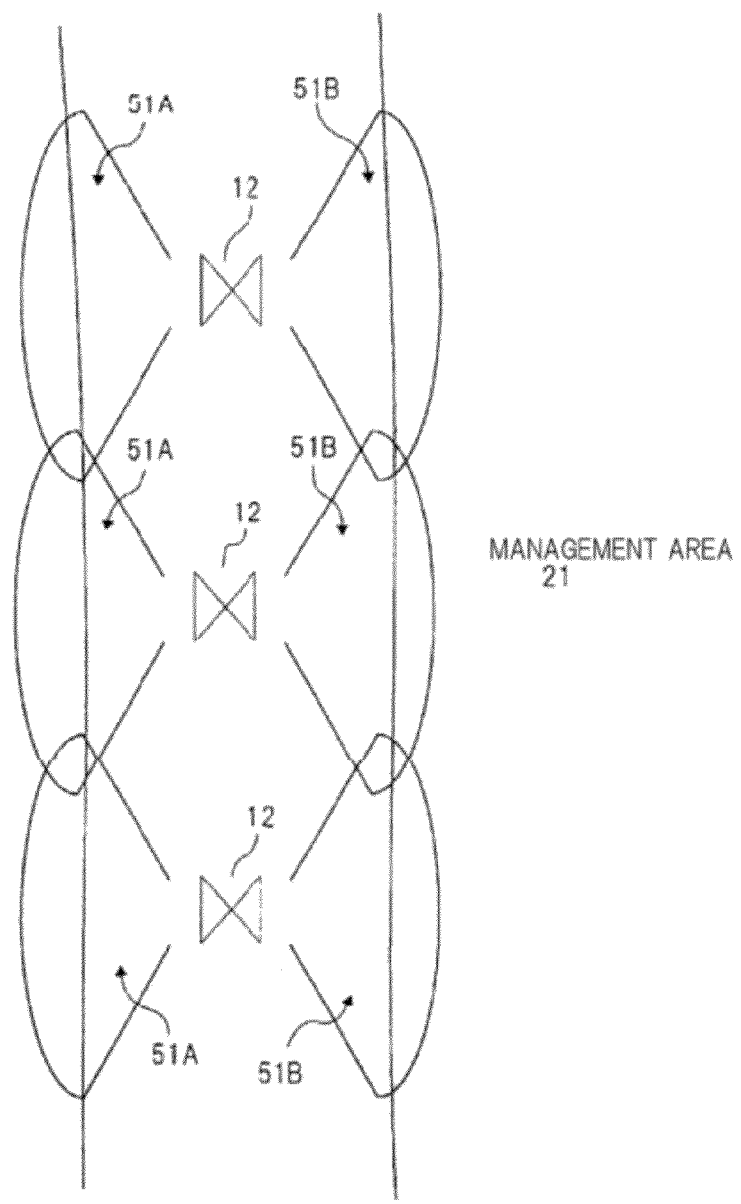
FIG. 7 is a view showing the placement of communication areas of base station apparatus 12 including two sectors.

Alternatively, base station apparatus 12 may include two sectors and provide the communication area of one sector for the outer borderline and the communication area of the other sector for the inner borderline. FIG. 7 is a view showing the placement of communication areas of base station apparatus 12 including two sectors. Referring to FIG. 7, base station apparatus 12 provides the communication areas of sectors, respectively, for two borderlines separating the inside and the outside of management area 21. Communication area 51A is provided for the outer borderline while communication area 51B is provided for the inner borderline.

When base station apparatus 12 communicates with mobile terminal 14 in the sector corresponding to communication area 51A and then communicates with mobile terminal 14 in the sector corresponding to communication area 51B, mobile terminal 14 may be determined to have entered management area 21. On the other hand, when base station apparatus 12 communicates with mobile terminal 14 in the sector corresponding to communication area 51B and then communicates with mobile terminal 14 in the sector corresponding to communication area 51A, mobile terminal 14 may be determined to have exited management area 21.

Second Exemplary Embodiment

Figure 8:
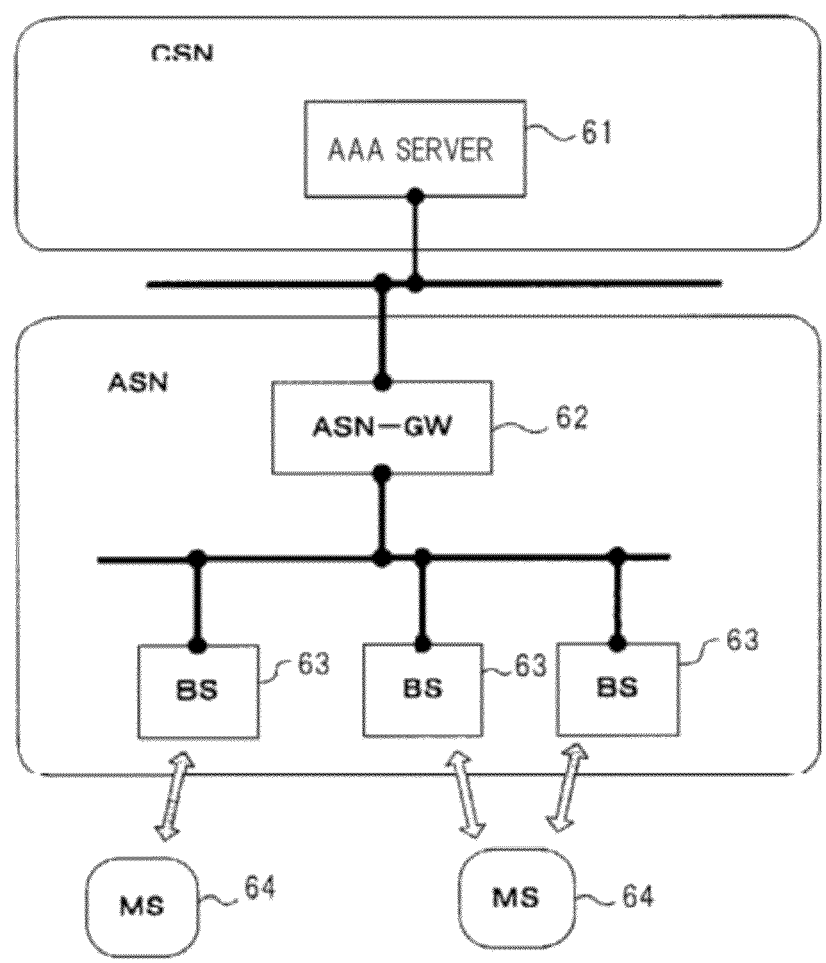
FIG. 8 is a block diagram showing the configuration of a radio communication system according to a second exemplary embodiment.

FIG. 8 is a block diagram showing the configuration of a radio communication system according to a second exemplary embodiment. In this exemplary embodiment, entry of a mobile terminal into a predetermined management area is monitored by a spatial gateway, and a mobile terminal having entered the management area is charged. The radio communication system according to this exemplary embodiment is configured using a WiMAX (Worldwide Interoperability for Microwave Access) system.

The radio communication system using the WiMAX system is composed of a CSN (Connectivity Service Network) and an ASN (Access Service Network).

The CSN is a network which provides an IP connection service for mobile terminal 64. The CSN includes AAA (Authentication, Authorization, and Accounting) server 61.

The ASN is an access network which connects wirelessly to mobile terminal (MS: Mobile Station) 64 and includes ASN-GW (ASN-Gateway) 62 and BS (Base Station) 63. BS 63 has a two-sector configuration and provides the communication areas of two sectors, respectively, for two borderlines, as shown in FIG. 6.

AAA server 61 is a server with the function of performing processes associated with authentication of a user or a terminal device, connection admission, bandwidth assurance, and accounting management. Upon receipt of a connection request from MS 64, AAA server 61 authenticates a user or a terminal device, allows a connection of MS 64, and allocates a predetermined bandwidth.

ASN-GW 62 is a gateway which connects the CSN and BS 63. ASN-GW 62 has the function of performing processes associated with management of the position of a terminal, authentication of a user or a terminal device, bandwidth management, and handover. ASN-GW 62 communicates with MS 64 via BS 63, like management apparatus 13 shown in FIG. 4, and detects entry of MS 64 into management area 21 on the basis of the status of the communication. This exemplary embodiment is configured such that BS 63 provides the communication areas of the two sectors for the two borderlines. Accordingly, if handover between the sectors occurs, ASN-GW 62 determines from the direction of the handover whether ASN-GW 62 has entered management area 21 or has exited from management area 21.

If ASN-GW 62 determines that MS 64 has entered management area 21, it notifies AAA server 61 of the entry and the identification information of MS 64. AAA server 61 charges a fee to MS 64 on the basis of the notification from ASN-GW 62.

BS 63 has the two-sector configuration and provides the communication areas of the sectors, respectively, for the two borderlines, like base station apparatus 12 shown in FIG. 7. BS 63 communicates with MS 64 in each communication area via a radio link.

Figure 9:
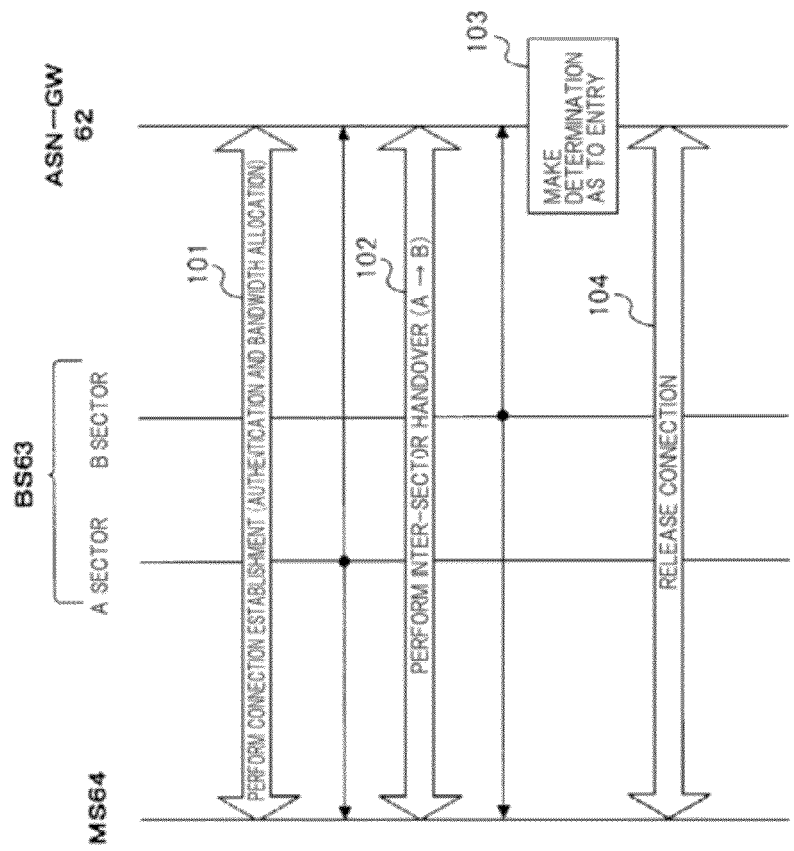
FIG. 9 is a sequence chart showing an example of the operation of the radio communication system according to the second exemplary embodiment.

FIG. 9 is a sequence chart showing an example of the operation of the radio communication system according to the second exemplary embodiment. When MS 64 enters the communication area of sector A, MS 64, BS 63, and ASN-GW 62 send and receive control signals to and from each other and establish a connection via sector A (step 101). When MS 64 enters the communication area of sector B after that, MS 64, BS 63, and ASN-GW 62 send and receive control signals to and from each other and execute inter-sector handover from sector A to sector B (step 102). ASN-GW 62 then determines that MS 64 has entered management area 21 (step 103). Finally, MS 64, BS 63, and ASN-GW 62 send and receive control signals to and from each other and release the connection from MS 64 (step 104).

Note that although this exemplary embodiment has illustrated an example in which ASN-GW 62 serves as management apparatus 13 according to the first exemplary embodiment and detects entry of MS 64 into management area 21, the present invention is not limited to this. As another example, AAA server 61 may serve as management apparatus 13 according to the first exemplary embodiment and detect entry of MS 64 into management area 21. In this case, ASN-GW 62, which manages handover, may notify AAA server 61 of the occurrence of inter-sector handover, and AAA server 61 may determine the presence or absence of entry of MS 64 into management area 21 on the basis of the notification.

Figure 10:
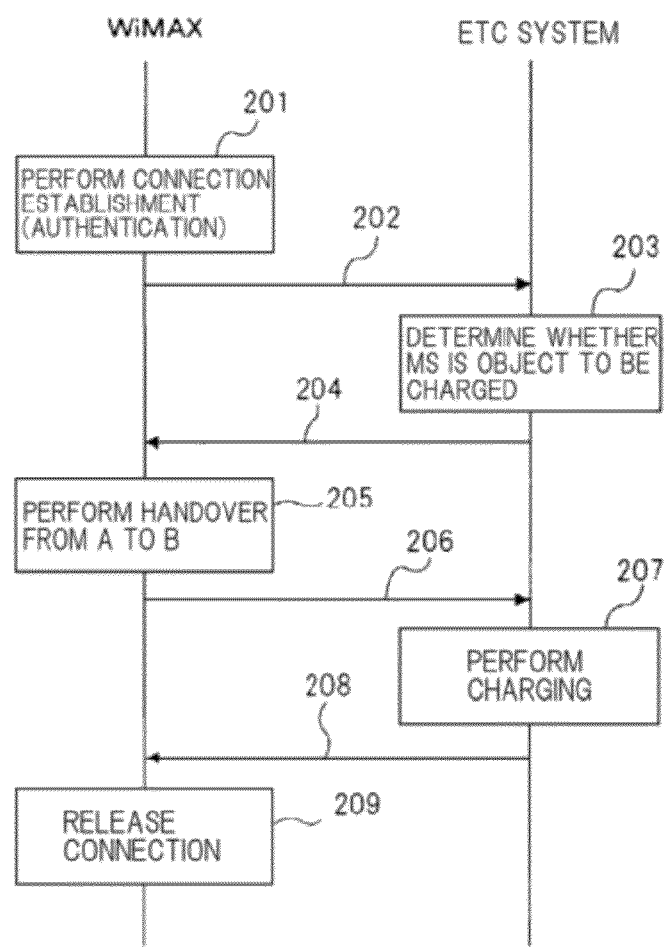
FIG. 10 is a sequence chart showing an example of how a radio communication system (WiMAX) according to the second exemplary embodiment and an ETC system cooperate with each other.

Imposition of a charge on MS 64 for entry into management area 21 in this exemplary embodiment may be implemented by cooperation with an ETC (Electronic Toll Collection) system. FIG. 10 is a sequence chart showing an example of how the radio communication system (WiMAX) according to the second exemplary embodiment and an ETC system cooperate with each other. Referring to FIG. 10, when the WiMAX system including AAA server 61, ASN-GW 62, and BS 63 establishes a connection with MS 64 (step 201), it notifies the ETC system of the establishment and the identification information of MS 64 (step 202).

The ETC system having received the notification determines whether MS 64 indicated by the identification information is a terminal to be charged a fee (step 203). Assume here that MS 64 is an object to be charged a fee. The ETC system notifies the WiMAX system that MS 64 is an object to be charged a fee (step 204).

When inter-sector handover of MS 64 then occurs (step 205), the WiMAX system having received the notification determines that MS 64 has entered management area 21 and notifies the ETC system of the entry (step 206).

The ETC system having received the notification performs charging a fee to MS 64 (step 207) and notifies the WiMAX system of the completion of the charging (step 208). The WiMAX system having received the notification releases the connection with MS 64 (step 209).

Note that if the determination in step 203 does not show that MS 64 is an object to be charged a fee, the ETC system may notify the WiMAX system to that effect, and the WiMAX system having received the notification may immediately release the connection.

Although the exemplary embodiments have been described above, the present invention is not limited to these exemplary embodiments. The exemplary embodiments may be used in combination or each exemplary embodiment may be partially modified, within the spirit and scope of the present invention.

While preferred exemplary embodiments of the present invention have been described using specific terms, such description is for illustrative purposes only, and it is to be understood that changes and variations may be made without departing from the spirit or scope of the following claims.

What is claimed is:

1. A radio communication system comprising a plurality of base station apparatuses,
   wherein communication areas of the plurality of base station apparatuses are connected in a loop to form a borderline separating an inside and an outside of a management area,
   a mobile terminal which enters the management area by crossing the borderline is detected on the basis of communication between the base station apparatuses and the mobile terminal,
   two borderlines including a first borderline and a second borderline are formed,
   whether the mobile terminal has entered the management area or has exited the management area is determined based on an order of the borderlines in which the mobile terminal communicates with the base station apparatus,
   wherein the radio communication system further comprises a management apparatus connected to the plurality of base station apparatuses which determines on the basis of a result of communication between a corresponding one of the base station apparatuses and the mobile terminal whether the mobile terminal has entered the management area, wherein after each of the base station apparatuses communicates with the mobile terminal in the communication area of the base station apparatus, the base station apparatus sends, to the management apparatus, a communication signal indicating the communication of the base station apparatus with the mobile terminal, and the management apparatus determines that the mobile terminal has entered the management area when the management apparatus receives, from one of the base station apparatuses which provides the communication area for the first borderline, a communication signal indicating communication with the mobile terminal and then receives, from one of the base station apparatuses which provides the communication area for the second borderline, a communication signal indicating communication with the mobile terminal and determines that the mobile terminal has exited the management area when the management apparatus receives, from one of the base station apparatuses which provides the communication area for the second borderline, a communication signal indicating communication with the mobile terminal and then receives, from one of the base station apparatuses which provides the communication area for the first borderline, a communication signal indicating communication with the mobile terminal.

2. The radio communication system according to claim 1, wherein the two borderlines are a first borderline and a second borderline, the mobile terminal is determined to have entered the management area when the mobile terminal communicates with one of the base station apparatuses on the first borderline and then communicates with one of the base station apparatuses on the second borderline, and the mobile terminal is determined to have exited the management area when the mobile terminal communicates with one of the base station apparatuses on the second borderline and then communicates with one of the base station apparatuses on the first borderline.

3. The radio communication system according to claim 2, wherein each of the base station apparatuses includes a first sector and a second sector, provides a communication area of the first sector for the first borderline, and provides a communication area of the second sector for the second borderline, the base station apparatus determines that the mobile terminal has entered the management area when the base station apparatus communicates with the mobile terminal in the first sector and then communicates with the mobile terminal in the second sector, and the base station apparatus determines that the mobile terminal has exited the management area when the base station apparatus communicates with the mobile terminal in the second sector and then communicates with the mobile terminal in the first sector.

4. The radio communication system according to claim 1, wherein each of the base station apparatuses includes a directional antenna with horizontal directivity, and a longitudinal direction of the corresponding borderline and a pointing direction of the directional antenna coincide with each other.

5. The radio communication system according to claim 1, wherein each of the base station apparatuses includes a first sector and a second sector, provides a communication area of the first sector for the first borderline, provides a communication area of the second sector for the second borderline, notifies the management apparatus that the mobile terminal has entered the management area when the base station apparatus communicates with the mobile terminal in the first sector and then communicates with the mobile terminal in the second sector, and notifies the management apparatus that the mobile terminal has exited the management area when the base station apparatus communicates with the mobile terminal in the second sector and then communicates with the mobile terminal in the first sector, and the management apparatus manages an entry of the mobile terminal into the management area and an exit of the mobile terminal from the management area in accordance with a notification from the base station apparatuses.

6. A movement management method, wherein communication areas of a plurality of base station apparatuses are connected in a loop to form a borderline separating an inside and an outside of a management area, and a mobile terminal which enters the management area by crossing the borderline is detected on the basis of communication between the base station apparatuses and the mobile terminal, each of the base station apparatuses includes a directional antenna with horizontal directivity, and a longitudinal direction of the corresponding borderline and a pointing direction of the directional antenna coincide with each other, wherein a management apparatus is connected to the plurality of base station apparatuses which determines on the basis of a result of communication between a corresponding one of the base station apparatuses and the mobile terminal whether the mobile terminal has entered the management area, wherein two borderlines including a first borderline and a second borderline are formed, after each of the base station apparatuses communicates with the mobile terminal in the communication area of the base station apparatus, the base station apparatus sends, to the management apparatus, a communication signal indicating the communication of the base station apparatus with the mobile terminal, and the management apparatus determines that the mobile terminal has entered the management area when the management apparatus receives, from one of the base station apparatuses which provides the communication area for the first borderline, a communication signal indicating communication with the mobile terminal and then receives, from one of the base station apparatuses which provides the communication area for the second borderline, a communication signal indicating communication with the mobile terminal and determines that the mobile terminal has exited the management area when the management apparatus receives, from one of the base station apparatuses which provides the communication area for the second borderline, a communication signal indicating communication with the mobile terminal and then receives, from one of the base station apparatuses which provides the communication area for the first borderline, a communication signal indicating communication with the mobile terminal.

7. The movement management method according to claim 6, wherein
whether the mobile terminal has entered the management area or has exited the management area is determined based on an order of the borderlines in which the mobile terminal communicates with the base station apparatus.

8. The movement management method according to claim 7, wherein
the mobile terminal is determined to have entered the management area when the mobile terminal communicates with one of the base station apparatuses on the first borderline and then communicates with one of the base station apparatuses on the second borderline, and
the mobile terminal is determined to have exited the management area when the mobile terminal communicates with one of the base station apparatuses on the second borderline and then communicates with one of the base station apparatuses on the first borderline.

9. The movement management method according to claim 8, wherein
each of the base station apparatuses includes a first sector and a second sector, provides a communication area of the first sector for the first borderline, and provides a communication area of the second sector for the second borderline,
the base station apparatus determines that the mobile terminal has entered the management area when the base station apparatus communicates with the mobile terminal in the first sector and then communicates with the mobile terminal in the second sector, and
the base station apparatus determines that the mobile terminal has exited the management area when the base station apparatus communicates with the mobile terminal in the second sector and then communicates with the mobile terminal in the first sector.

10. A management apparatus comprising:
communication unit that communicates with a plurality of base station apparatuses whose communication areas are connected in a loop to form a borderline separating an inside and an outside of a management area and acquires a status of communication between the base station apparatuses and a mobile terminal; and
detection unit that detects an entry of the mobile terminal into the management area on the basis of the status of communication acquired by the communication unit,
wherein two borderlines including a first borderline and a second borderline are formed,
after each of the base station apparatuses communicates with the mobile terminal in the communication area of the base station apparatus, the base station apparatus sends, to the management apparatus, a communication signal indicating the communication of the base station apparatus with the mobile terminal,
the detection apparatus determines that the mobile terminal has entered the management area when the communication apparatus receives, from one of the base station apparatuses which provides the communication area for the first borderline, a communication signal indicating communication with the mobile terminal and then receives, from one of the base station apparatuses which provides the communication area for the second borderline, a communication signal indicating communication with the mobile terminal, and
the detection apparatus determines that the mobile terminal has exited the management area when the communication apparatus receives, from one of the base station apparatuses which provides the communication area for the second borderline, a communication signal indicating communication with the mobile terminal and then receives, from one of the base station apparatuses which provides the communication area for the first borderline, a communication signal indicating communication with the mobile terminal.

11. The management apparatus according to claim 10, wherein
each of the base station apparatuses includes a first sector and a second sector, provides a communication area of the first sector for the first borderline, provides a communication area of the second sector for the second borderline, notifies the management apparatus that the mobile terminal has entered the management area when the base station apparatus communicates with the mobile terminal in the first sector and then communicates with the mobile terminal in the second sector, and notifies the management apparatus that the mobile terminal has exited the management area when the base station apparatus communicates with the mobile terminal in the second sector and then communicates with the mobile terminal in the first sector,
the communication unit receives a notification from the base station apparatuses, and
the detection unit manages an entry of the mobile terminal into the management area and an exit of the mobile terminal from the management area in accordance with the notification received by the communication unit.

12. A base station apparatus comprising:
communication unit that communicates with a mobile terminal in one of the communication areas of a plurality of base station apparatuses which are connected in a loop to form a borderline separating an inside and an outside of a management area; and
detection unit that detects an entry of the mobile terminal into the management area on the basis of a status of communication with the mobile terminal acquired by the communication unit, wherein
the communication unit includes a directional antenna with horizontal directivity, and a longitudinal direction of the corresponding borderline and a pointing direction of the directional antenna coincide with each other,
wherein a management apparatus is connected to the plurality of base station apparatuses and determines on the basis of a result of communication between a corresponding one of the base station apparatuses and the mobile terminal whether the mobile terminal has entered the management area,
wherein
two borderlines including a first borderline and a second borderline are formed,
after each of the base station apparatuses communicates with the mobile terminal in the communication area of the base station apparatus, the base station apparatus sends, to the management apparatus, a communication signal indicating the communication of the base station apparatus with the mobile terminal, and
the management apparatus determines that the mobile terminal has entered the management area when the management apparatus receives, from one of the base station apparatuses which provides the communication area for the first borderline, a communication signal indicating communication with the mobile terminal and then receives, from one of the base station apparatuses which provides the communication area for the second borderline, a communication signal indicating communication with the mobile terminal and determines that the mobile terminal has exited the management area when the management apparatus receives, from one of the base station apparatuses which provides the communication area for the second borderline, a communication signal indicating communication with the mobile terminal and then receives, from one of the base station apparatuses which provides the communication area for the first borderline, a communication signal indicating communication with the mobile terminal.

13. The base station apparatus according to claim 12, wherein the communication unit includes a first sector and a second sector, provides a communication area of the first sector for the first borderline, and provides a communication area of the second sector for the second borderline, the detection unit determines that the mobile terminal has entered the management area when the communication unit communicates with the mobile terminal in the first sector and then communicates with the mobile terminal in the second sector, and the detection unit determines that the mobile terminal has exited the management area when the communication unit communicates with the mobile terminal in the second sector and then communicates with the mobile terminal in the first sector.

* * * * *